US010901205B1

(12) United States Patent
Lu et al.

(10) Patent No.: US 10,901,205 B1
(45) Date of Patent: Jan. 26, 2021

(54) FOCUS ADJUSTING LIQUID CRYSTAL LENSES IN A HEAD-MOUNTED DISPLAY

(71) Applicant: Facebook Technologies, LLC, Menlo Park, CA (US)

(72) Inventors: Lu Lu, Seattle, WA (US); Pasi Saarikko, Kirkland, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/672,458

(22) Filed: Aug. 9, 2017

Related U.S. Application Data

(60) Provisional application No. 62/372,387, filed on Aug. 9, 2016.

(51) Int. Cl.
| | |
|---|---|
| *G09G 5/00* | (2006.01) |
| *G06F 3/01* | (2006.01) |
| *G02B 27/00* | (2006.01) |
| *G02B 27/01* | (2006.01) |
| *G06F 1/16* | (2006.01) |
| *G06F 3/00* | (2006.01) |

(52) U.S. Cl.
CPC ....... *G02B 27/0093* (2013.01); *G02B 27/017* (2013.01); *G06F 1/163* (2013.01); *G06F 3/005* (2013.01); *G06F 3/013* (2013.01)

(58) Field of Classification Search
CPC ........... G06F 1/163; G06F 3/005; G06F 3/013
See application file for complete search history.

(56) References Cited

U.S. PATENT DOCUMENTS

| | | | |
|---|---|---|---|
| 6,115,152 A | 9/2000 | Popovich et al. | |
| 9,429,756 B1* | 8/2016 | Cakmakci | G02B 27/0172 |
| 10,151,961 B2 | 12/2018 | Lu et al. | |
| 2002/0176148 A1 | 11/2002 | Onuki et al. | |
| 2005/0047705 A1 | 3/2005 | Domash et al. | |
| 2005/0254752 A1 | 11/2005 | Domash et al. | |
| 2007/0097277 A1* | 5/2007 | Hong | G02B 3/14 |
| | | | 349/11 |

(Continued)

FOREIGN PATENT DOCUMENTS

| | | |
|---|---|---|
| CN | 105911697 A | 8/2016 |
| CN | 106654592 A | 5/2017 |

(Continued)

OTHER PUBLICATIONS

"High birefringence liquid crystal mixtures for electro-optical devices," Optica Applicata XLII, No. 1, 2012.*

(Continued)

*Primary Examiner* — Md Saiful A Siddiqui
(74) *Attorney, Agent, or Firm* — Morgan, Lewis & Bockius LLP (57) ABSTRACT

A head-mounted display (HMD) includes an electronic display configured to emit an image. The HMD also includes an eye tracking module configured to determine a position of an eye of a user of the HMD, and a varifocal block. The varifocal block includes a stacked liquid crystal (LC) structure that has a tunable optical power. The varifocal block is configured to present the image to the user of the HMD at an adjustable focal distance that is determined by the tunable optical power and is based in part on the determined position of the eye.

20 Claims, 6 Drawing Sheets

(56) References Cited

U.S. PATENT DOCUMENTS

| | | |
|---|---|---|
| 2009/0316097 A1 | 12/2009 | Presniakov et al. |
| 2010/0231783 A1 | 9/2010 | Bueler et al. |
| 2012/0019523 A1 | 1/2012 | Lee et al. |
| 2012/0154924 A1 | 6/2012 | Lee et al. |
| 2013/0176203 A1* | 7/2013 | Yun .................... G02B 27/2214 345/156 |
| 2013/0215374 A1* | 8/2013 | Blum .................... G02C 7/081 351/158 |
| 2013/0307948 A1* | 11/2013 | Odake .................... H04N 13/32 348/59 |
| 2014/0022619 A1 | 1/2014 | Woodgate et al. |
| 2014/0204455 A1 | 7/2014 | Popovich et al. |
| 2014/0300711 A1* | 10/2014 | Kroon .................. H04N 13/302 348/51 |
| 2014/0361990 A1 | 12/2014 | Leister |
| 2015/0010265 A1 | 1/2015 | Popovich et al. |
| 2015/0234187 A1* | 8/2015 | Lee .................... G02B 27/0172 345/8 |
| 2016/0103253 A1 | 4/2016 | Oku et al. |
| 2016/0327793 A1* | 11/2016 | Chen .................. G02B 27/0172 |
| 2016/0349506 A1 | 12/2016 | Meneghini et al. |
| 2017/0293145 A1* | 10/2017 | Miller ................ G02B 27/0172 |
| 2018/0132698 A1* | 5/2018 | Galstian .................... G02F 1/29 |

FOREIGN PATENT DOCUMENTS

| | | |
|---|---|---|
| WO | WO 2004/003596 A2 | 1/2004 |
| WO | WO 2008/026206 A2 | 3/2008 |
| WO | WO 2014/181419 A1 | 11/2014 |

OTHER PUBLICATIONS

Banks, M.S. et al., "Consequences of Incorrect Focus Cues in Stereo Displays," SIDS Information Display Online, Jul. 2008, 7 pages, [Online] [Retrieved on Jun. 26, 2017] Retrieved from the Internet<URL:http://informationdisplay.org/IDArchive/2008/July/ConsequencesofIncorrectFocusCuesinStereoDis.aspx>.

Crawford, G.P., "Electrically Switchable Bragg Gratings," Optics & Photonics News, Apr. 2003, pp. 54-59, vol. 14, No. 4.

Hoffman, D.M. et al., "Vergence—Accomodation Conflicts Hinder Visual Performance and Cause Visual Fatigue," Journal of Vision, Mar. 2008, pp. 1-30, vol. 8, No. 33.

Shibata, T. et al., "The Zone of Comfort: Predicting Visual Discomfort with Stereo Displays," Journal of Vision, Jul. 2011, pp. 1-29, vol. 11(8), No. 11.

\* cited by examiner (Real World)

FIG. 1A (3D Display)

FOCUS ADJUSTING LIQUID CRYSTAL LENSES IN A HEAD-MOUNTED DISPLAY

CROSS REFERENCE TO RELATED APPLICATIONS

This application claims the benefit of U.S. Provisional Application No. 62/372,387, filed Aug. 9, 2016, which is incorporated by reference in its entirety.

BACKGROUND

The present disclosure generally relates to enhancing images from electronic displays, and specifically to varying the focal length of optics to enhance comfortable viewing experience in head mounted displays.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts. Augmented Reality (AR) headsets display a virtual image overlapping with the real world. To create comfortable viewing experience, the virtual image generated by the AR headsets needs to be displayed at the right distance for the eye accommodations of the real world objects at different time.

SUMMARY

A varifocal block for a head-mounted display (HMD) includes one or more liquid crystal (LC) lenses. The HMD presents content via an electronic display to a wearing user at a focal distance. The varifocal block adjusts the focal distance in accordance with varifocal instructions from the HMD to, e.g., mitigate vergence accommodation conflict of eyes of the wearing user. The focal distance is adjusted by adjusting an optical power associated with the varifocal block, and specifically by adjusting the optical powers associated with one or more of the LC lenses within the varifocal block.

The varifocal block includes a plurality of stacked LC structures. Multiple liquid crystal lenses are coupled together in series to form a stacked LC structure that has a tunable range of optical power. As each LC lens provides a particular amount of optical power, the tunable range of optical power is determined in part by a number of LC lenses in each stacked LC structure and how much optical power a particular LC can provide. An activated LC lens provides either positive or negative optical power (e.g., ±0.25 Diopter) to the varifocal block. One or more of the LC lenses in a stacked LC structure may be individually and selectively activated or deactivated (e.g., responsive to a signal from the HMD) to tune the optical power of the stacked LC structure to a specific value.

In some embodiments, an activated LC lens forms a Fresnel structure to provide optical power to the varifocal block. A deactivated LC lens generally provides negligible optical power. However, in some embodiments, a deactivated LC may be configured to provide some baseline amount of optical power. In some embodiments, each of the LC lenses in a stacked LC structure have parallel alignment. Alternatively, in some embodiments, each of the LC lenses in a stacked LC structure have anti-parallel alignment. To improve the optical power associated with the LC lenses, one or more of the LC lenses may include a LC medium with a large birefringence, a fast response time, or some combination thereof.

In some embodiments, the electronic display includes one or more sub-pixels, and the sub-pixels may be composed of a one or more quantum dot light emitting diodes (QLEDs), quantum dot organic light emitting diodes (QOLEDS). The QLEDS and/or QOLEDS may provide increased image quality to offset, e.g., image degradation caused by used of a Fresnel structure by one or more of the LC structures.

In some embodiments, a virtual object is presented on the electronic display of the HMD. The varifocal light is configured to have a particular focal distance, such that the virtual scene appears to a user at a particular focal plane. As the content to be rendered moves closer/farther from the user, the HMD correspondingly instructs the varifocal block to adjust the focal distance to mitigate a possibility of a user experiencing a conflict with eye vergence and eye accommodation. Additionally, in some embodiments, the HMD may track a user's eyes to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the HMD adjusts the distance of the varifocal block to keep the user's eyes in a zone of comfort as vergence and accommodation change.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
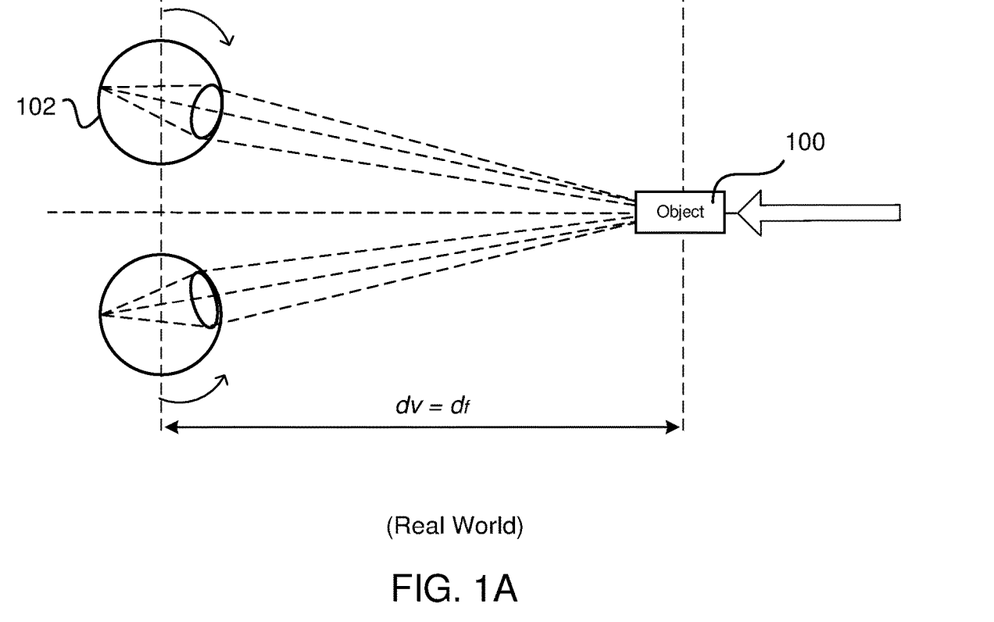
FIG. 1A shows the relationship between vergence and eye focal length in the real world.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes looks at a new object at a distance different from an object they had been looking at, the eyes automatically change focus (by changing their shape) to provide accommodation at the new distance or vergence depth of the new object. FIG. 1A shows an example of how the human eye experiences vergence and accommodation in the real world. In the example of FIG. 1A, the user is looking at a real object 100 (i.e., the user's eyes are verged on the real object 100 and gaze lines from the user's eyes intersect at real object 100.). As the real object 100 is moved closer to the user, as indicated by the arrow in FIG. 1A, each eye 102 rotates inward (i.e., convergence) to stay verged on the real object 100A. As the real object 100 gets closer, the eye 102 must "accommodate" for the closer distance by changing its shape to reduce the power or focal length. Thus, under normal conditions in the real world, the vergence depth ($d_v$) equals the focal length ($d_f$).

Figure 1B:
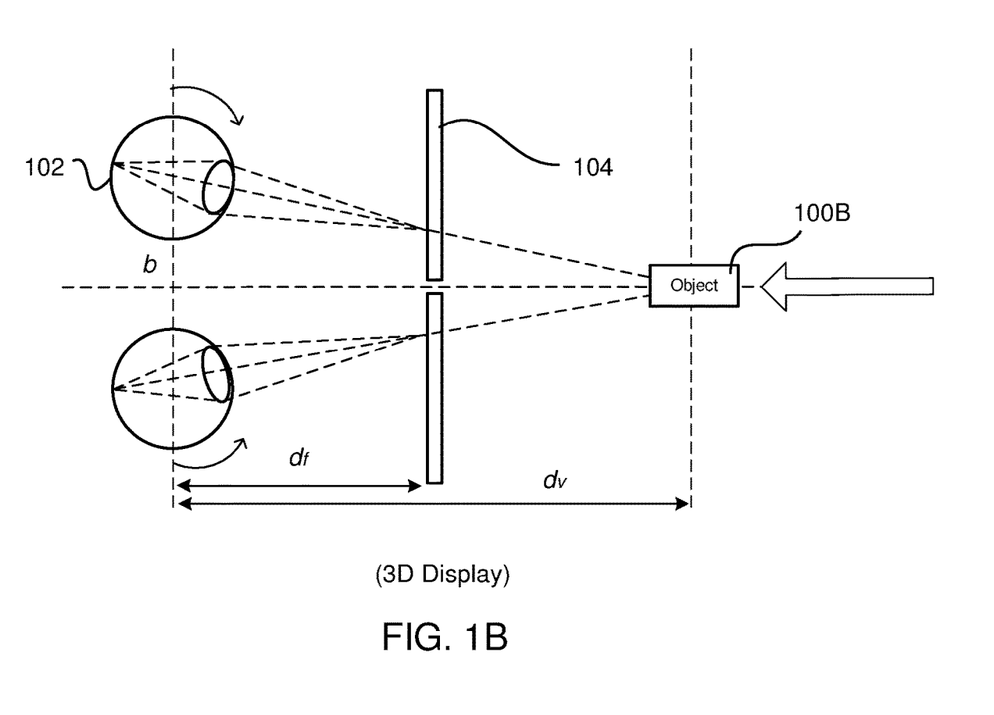
FIG. 1B shows the conflict between vergence and eye focal length in a three-dimensional display screen.

FIG. 1B shows an example conflict between vergence and accommodation that can occur with some three-dimensional displays. In this example, a user is looking at a virtual object 100B displayed on an electronic screen 104; however, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, each eye 102 maintains accommodation at a distance associated with the electronic display 104. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2A:
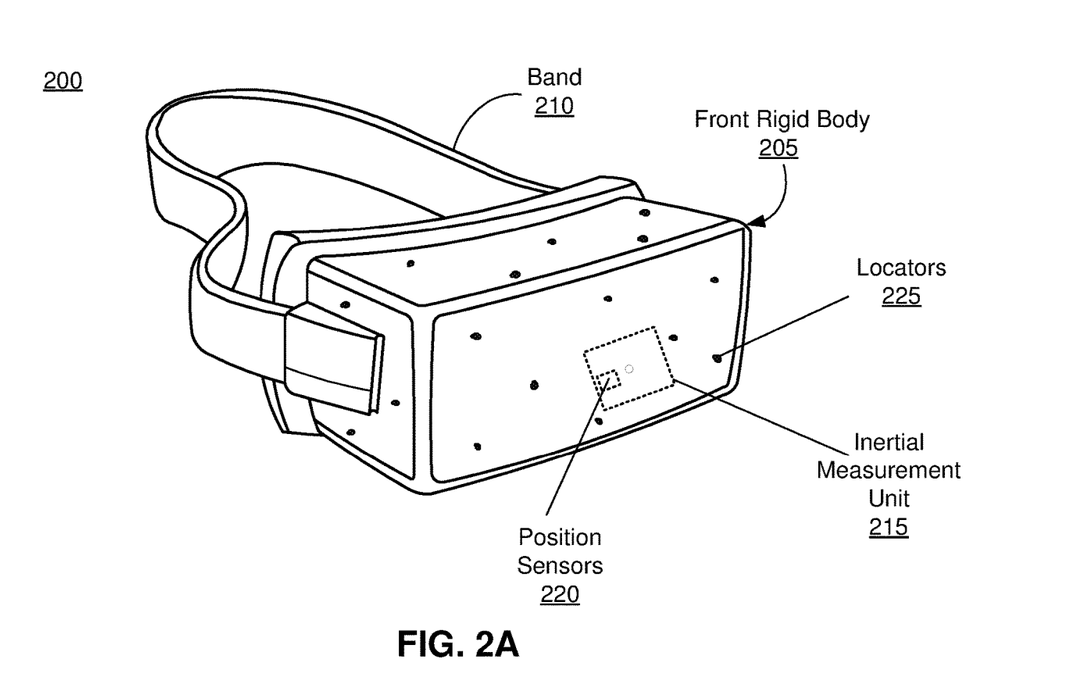
FIG. 2A is a wire diagram of a head-mounted display, in accordance with an embodiment.

FIG. 2A is a wire diagram of a HMD 200, in accordance with an embodiment. The HMD 200 includes a front rigid body 205 and a band 210. The front rigid body 205 includes one or more electronic display elements of an electronic display (not shown), an IMU 215, the one or more position sensors 220, and the locators 225. In the embodiment shown by FIG. 2A, the position sensors 220 are located within the IMU 215, and neither the IMU 215 nor the position sensors 220 are visible to the user.

Figure 2B:
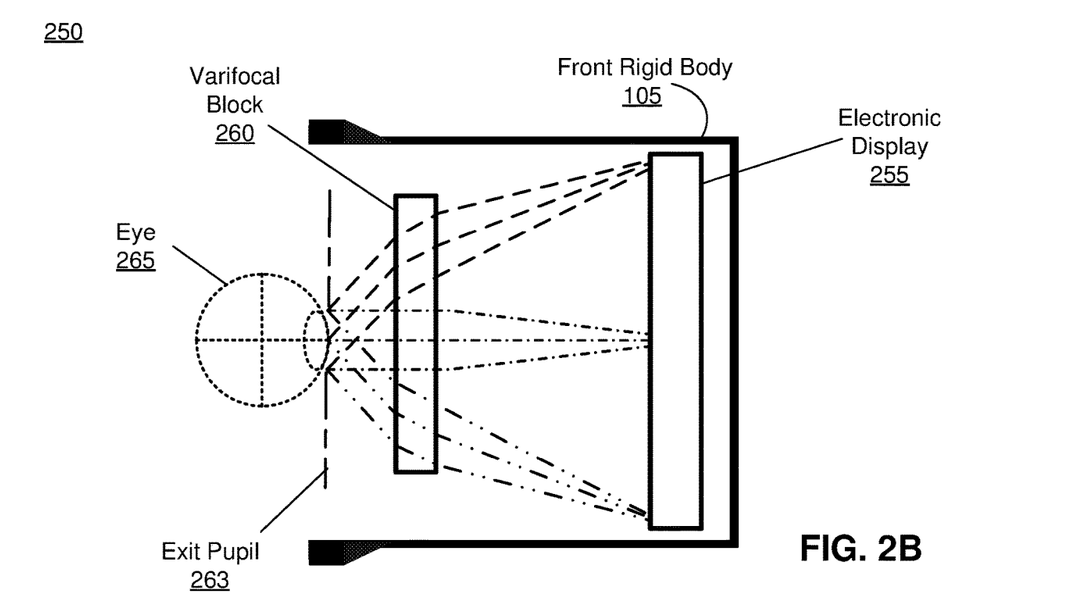
FIG. 2B is a cross section of a front rigid body of the head-mounted display in FIG. 2A, in accordance with an embodiment.

FIG. 2B is a cross section 250 of the front rigid body 205 of the embodiment of the HMD 200 shown in FIG. 2A. As shown in FIG. 2B, the front rigid body 205 includes an electronic display 255 and a varifocal block 260 that together provide image light to an exit pupil 263. The exit pupil 263 is the location of the front rigid body 205 where a user's eye 265 is positioned. For purposes of illustration, FIG. 2B shows a cross section 250 associated with a single eye 265, but another varifocal block 260, separate from the varifocal block 260, provides altered image light to another eye of the user.

The electronic display 255 displays images to the user. In various embodiments, the electronic display 255 may comprise a single electronic display or multiple electronic displays (e.g., a display for each eye of a user). Examples of the electronic display 255 include: a liquid crystal display (LCD), an organic light emitting diode (OLED) display, an active-matrix organic light-emitting diode display (AMO-LED), a display including one or more QOLED sub-pixels, a display including one or more QLED sub-pixels, some other display, or some combination thereof.

The varifocal block 260 adjusts an orientation from light emitted from the electronic display 255 such that it appears at particular focal distances from the user. The varifocal block 260 includes one or more LC lenses. Unlike LC displays, which are based on a change in the polarization state of transmitted light resulting from the refractive index modulation, LC lenses use the resultant phase of linearly polarized light exiting the surface. Each LC lens is associated with a positive or negative optical power. An activated LC lens provides either positive or negative optical power (e.g., ±0.25 Diopter) to the varifocal block 260. An active optical power is an amount of optical power a LC lens provides while the LC is active (i.e., applied voltage is above some threshold value), and an inactive optical power is an amount of optical power a LC lens provides while the LC is inactive (e.g., no applied voltage). A LC lens is activated by, e.g., applying a voltage to one or more electrodes coupled to the LC lens.

A LC lens includes a liquid crystal medium. In some embodiments, the liquid crystal medium may have a fast response time (e.g., dual-frequency liquid crystal materials, ferroelectric liquid crystal materials, etc.) in the range of 300 ms or even faster, have a high birefringence larger than 0.35 with minimized color dispersion, or some combination thereof. The use of a liquid crystal medium with a high birefringence (e.g., W1791, W1865, W1825 as discussed by Nowinowski-Kruszelnicki et al. in "High birefringence liquid crystal mixtures for electro-optical devices," Optica Applicata XLII, No. 1, 2012) helps increase the amount of optical power an LC may provide to the varifocal block 260. Additionally, use of a liquid crystal medium with a fast response time allows for rapid changes in optical power of the varifocal block 260 (e.g., allows for rapid adjustment in image focal distance as virtual objects are being presented to a user via the HMD 200). For example, typically switching speeds of ~300 ms or faster are used to meet accommodation requirements of vergence and accommodation for human eyes.

Note that the HMD 200 has a relatively large aperture (e.g., greater than 4 cm). Large aperture size and large optical power would generally result in a LC lens having a very thick LC layer. However, switching time of an LC lens increases with its thickness. Additionally, in a LC lens with large aperture size, the tradeoff between the switching speed and the lens power can't be solved by a refractive type of LC lens. Accordingly, in some embodiments, the one or more LC lenses within the varifocal block 260 are used to form a Fresnel structure (i.e., a Fresnel lens) to provide optical power to the varifocal block 260 with a faster speed. However, the image quality of a Fresnel type lens is generally not acceptable for high end head-mounted displays (for example, a Fresnel lens with a 2pi phase fixed depth), especially the off-axis image quality on the lens edges. To solve those trade-offs, the design of the lens structure, liquid crystal materials and light source bandwidth is critical to realize focus adjustable liquid crystal lens in head-mounted displays. In some embodiments, a number of Fresnel zones associated with a Fresnel structure is fixed (e.g., may be fixed by specific arrangement of electrodes coupled to a LC lens). For example, in some embodiments a LC lens forms a Fresnel structure having 8 Fresnel zones. However, in other embodiments, some other number of Fresnel zones may be formed (e.g., 10, 12, or less etc.) In alternate embodiments, the HMD 200 is able to vary a number of Fresnel zones formed by a LC lens. Note, that in some embodiments, the electronic display may be composed of QLEDS and/or QOLEDS to offset potential reductions in optical image quality caused by the LC lens(es) forming Fresnel structures. In these embodiments, the combination of the quantum dots LEDs or quantum dots OLEDs with a limited number of Fresnel zones in the liquid crystal lens is important for the image quality (e.g. angular resolutions).

In some embodiments, a LC lens may be formed using substrates with an inhomogeneous thickness. For example, a LC lens may be formed using two substrates that are on opposite sides of a LC medium. One substrate may have a Fresnel structure (or a curved lens surface) and the other substrate may be flat. When the LC lens is active the LC medium is aligned (e.g., vertically) and the substrate with the Fresnel structure would function as a Fresnel lens. Likewise, if the LC lens is inactive (e.g., no applied voltage) an index of the LC medium matches with the substrate and there the LC does not have optical power.

Alternatively, a LC lens may be formed using substrates with homogenous thickness. In this case, both substrates are flat and have the LC medium between them. A lens profile is created by controlling the LC alignment spatially. Spatial control of the LC alignment may occur by, e.g., electrode patterning to create an in-homogenous voltage profile across the substrate (e.g., electric-holes, electric-ring patterns, crossed stripes patterns, hidden layer under the glass substrates, dual conductive layer patterning, etc.), or via inhomogeneous surface-alignment with the assistance of reactive monomers or photo-alignment materials (e.g., surface localized polymer aligned liquid crystal lenses, geometric phase lenses, etc.).

The LC lenses within the varifocal block 260 are stacked in series to create a stacked LC structure. Some example stacked structures are discussed below with regard to FIGS. 3A and 3B. A stacked LC structure includes a plurality of LC lenses (e.g., 4, 5, 6, 7, 8, etc.) that are coupled together in a manner that the overall optical power of the stacked LC structure is tunable over a range of optical powers. The tunability is based in part on a number of the individual LC lenses that make up the stacked LC structure and how much optical power is associated with each individual LC lens. Tuning to a particular optical power is accomplished by activating or deactivating one or more of the LC lenses within the stacked LC structure. In some embodiments, each LC lens within a stacked LC structure is the same. In other embodiments, one or more of the LC lenses within a stacked LC structure is different than another LC lens within the stacked LC structure. For example, one LC lens (when active) provide 0.25 diopters of optical power while another LC lens (when active) provide 0.1 diopters of optical power.

Moreover, as the individual LC lenses each contribute a relatively low amount of optical power to the varifocal block 260, each of them may have a fast switching time. Accordingly, a stacked LC structure may be designed to have a relatively high optical power (e.g., 2 or more diopters) while having a fast switching speed (e.g., ~300 ms). Accordingly, a stacked LC structure may be used to provide increased optical power to the varifocal block 260. For example, if each LC lens provides 0.25 diopters of optical power, 8 LC lenses would provide ~2 diopters of optical power to the varifocal block 260. The stacked LC structure may be formed from individual LC lenses stacked in a parallel manner, an anti-parallel manner (has an advantage of better off-axis performance as it is self-compensated), or some combination thereof.

Additionally, in some embodiments, the varifocal block 260 magnifies received light, corrects optical errors associated with the image light, and presents the corrected image light is presented to a user of the HMD 200. The varifocal block 260 may additionally include one or more optical elements. An optical element may be an aperture, a Fresnel lens, a convex lens, a concave lens, a filter, or any other suitable optical element that affects the blurred image light. Moreover, the varifocal block 260 may include combinations of different optical elements. In some embodiments, one or more of the optical elements in the varifocal block 260 may have one or more coatings, such as anti-reflective coatings.

Figure 3A:
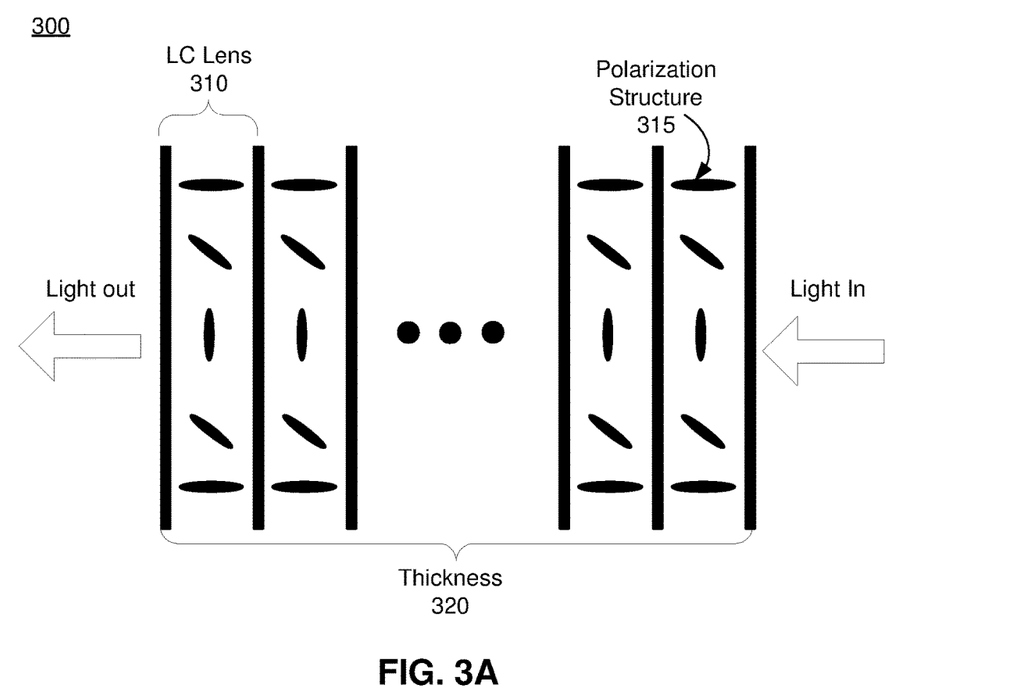
FIG. 3A is a diagram of a parallel stacked LC structure according to an embodiment.

FIG. 3A is a diagram of a parallel stacked LC structure 300 according to an embodiment. The stacked LC structure 300 includes a plurality of LC lenses 310. As LC lenses 310 in the stacked LC structure 300 are stacked in parallel a polarization structure 315 of each LC lens 310 is the same. Light enters the stacked LC structure 300 which then propagates through each of the individual LC lenses 310. One or more of the LC lenses 310 may be activated such that they form respective Fresnel structures that each individual provide optical power to the system. For example, an active LC lens 310 may provide 0.1 diopter, 0.2 diopters, 0.25 diopters, etc. The total optical power of the stacked LC structure 300 may vary by simply activating or deactivating one or more of the LC lenses 310 in the stacked LC structure 310. Accordingly, an HMD is able to dynamically vary (i.e., tune) an optical power of the LC stacked structure 300 by simply activating and/or deactivating various LC lenses 310 within the LC stacked structure 300. In some embodiments, each LC lens 310 is separated from an adjacent LC lens 310 by, e.g., a sheet of thin glass, an index matched glue, a plastic film, or some combination thereof. Additionally, by using LC lenses 310 that have a liquid crystal medium with a high birefringence the number of LC lenses 310 needed to achieve a particular optical power may be reduced and/or a thickness 320 of the stacked LC structure 300 may be reduced.

Figure 3B:
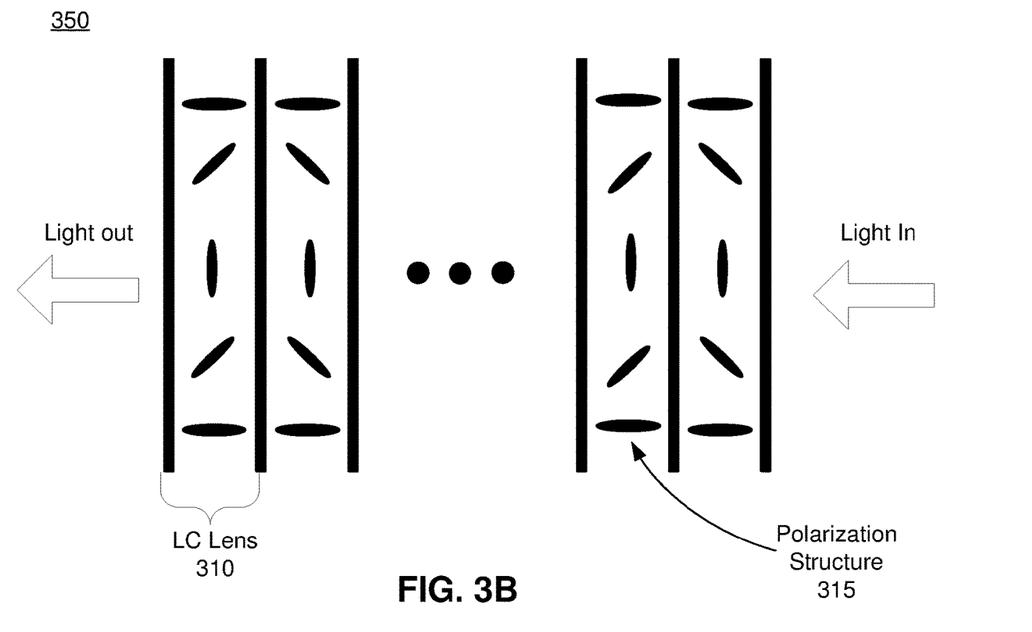
FIG. 3B is a diagram of an anti-parallel stacked LC structure according to an embodiment.

FIG. 3B is a diagram of an anti-parallel stacked LC structure 350 according to an embodiment. The stacked LC structure 350 is substantially the same as the LC device 300 except that the LC lenses are stacked such that the polarization structures 315 of adjacent LC lenses are reversed. One advantage to anti-parallel stacking is that it results in better off-axis performance because it self-compensates.

System Overview

Figure 4:
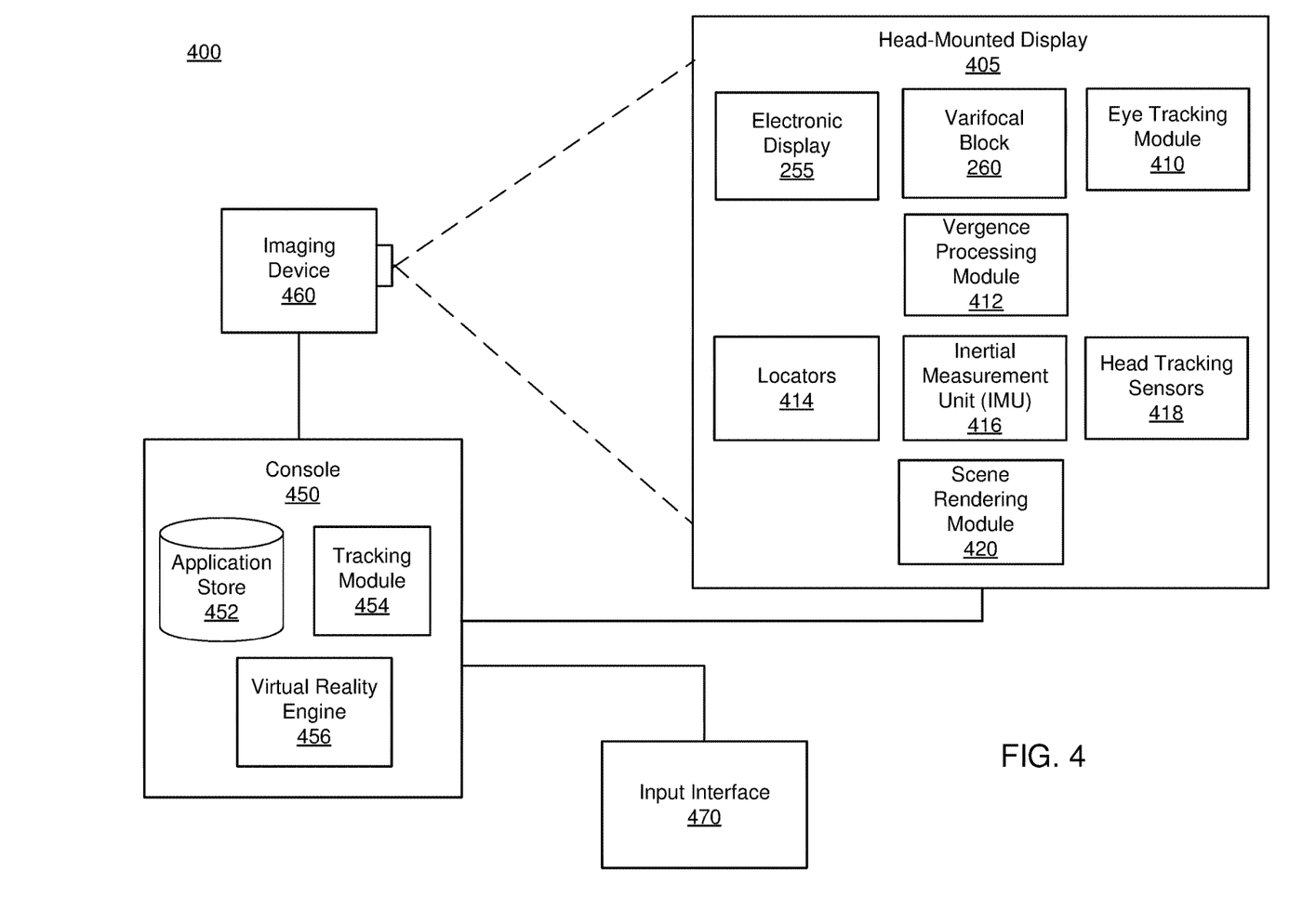
FIG. 4 is varifocal system in which a HMD operates, according to an embodiment.

FIG. 4 is varifocal system 400 in which a HMD 405 operates. The varifocal system 400 may be for use as a virtual reality (VR) system, an augmented reality (AR) system, a mixed reality (MR) system, or some combination thereof. In this example, the varifocal system 400 includes a HMD 405, an imaging device 460, and an input interface 470, which are each coupled to a console 450. While FIG. 4 shows a single HMD 405, a single imaging device 460, and a single input interface 470, in other embodiments, any number of these components may be included in the system. For example, there may be multiple HMDs 400 each having an associated input interface 470 and being monitored by one or more imaging devices 460, with each HMD 405, input interface 470, and imaging devices 460 communicating with the console 450. In alternative configurations, different and/or additional components may also be included in the varifocal system 400. The HMD 405 may act as a VR, AR, and/or a MR HMD. An MR and/or AR HMD augments views of a physical, real-world environment with computer-generated elements (e.g., images, video, sound, etc.).

The HMD 405 presents content to a user. In some embodiments, the HMD 405 is an embodiment of the HMD 200 described above with reference to FIGS. 2A and 2B. Example content includes images, video, audio, or some combination thereof. Audio content may be presented via a separate device (e.g., speakers and/or headphones) external to the HMD 405 that receives audio information from the HMD 405, the console 450, or both. The HMD 405 includes an electronic display 255 (described above with reference to FIG. 2B), a varifocal block 260 (described above with reference to FIG. 2B), an eye tracking module 410, a vergence processing module 412, one or more locators 414, an internal measurement unit (IMU) 416, head tracking sensors 418, and a scene rendering module 420.

As noted above with reference to FIG. 2B, the varifocal block 260 activates and/or deactivates LC lenses to adjust a focal length (adjusts optical power) of the varifocal block 260. The varifocal block 260 adjusts its focal length responsive to varifocal instructions from the console 450.

The eye tracking module 410 tracks an eye position and eye movement of a user of the HMD 405. A camera or other optical sensor inside the HMD 405 captures image information of a user's eyes, and eye tracking module 410 uses the captured information to determine interpupillary distance, interocular distance, a three-dimensional (3D) position of each eye relative to the HMD 405 (e.g., for distortion adjustment purposes), including a magnitude of torsion and rotation (i.e., roll, pitch, and yaw) and gaze directions for each eye. In one example, infrared light is emitted within the HMD 405 and reflected from each eye. The reflected light is received or detected by the camera and analyzed to extract eye rotation from changes in the infrared light reflected by each eye. Many methods for tracking the eyes of a user can be used by eye tracking module 410. Accordingly, the eye tracking module 410 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 410 integrates information from past measurements, measurements identifying a position of a user's head, and 3D information describing a scene presented by the electronic display 255. Thus, information for the position and orientation of the user's eyes is used to determine the gaze point in a virtual scene presented by the HMD 405 where the user is looking.

The vergence processing module 412 determines a vergence depth of a user's gaze based on the gaze point or an estimated intersection of the gaze lines determined by the eye tracking module 410. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 412 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 414 are objects located in specific positions on the HMD 405 relative to one another and relative to a specific reference point on the HMD 405. A locator 414 may be a light emitting diode (LED), a corner cube reflector, a reflective marker, a type of light source that contrasts with an environment in which the HMD 405 operates, or some combination thereof. Active locators 414 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 414 can be located beneath an outer surface of the HMD 405, which is transparent to the wavelengths of light emitted or reflected by the locators 414 or is thin enough not to substantially attenuate the wavelengths of light emitted or reflected by the locators 414. Further, the outer surface or other portions of the HMD 405 can be opaque in the visible band of wavelengths of light. Thus, the locators 414 may emit light in the IR band while under an outer surface of the HMD 405 that is transparent in the IR band but opaque in the visible band.

The IMU 416 is an electronic device that generates fast calibration data based on measurement signals received from one or more of the head tracking sensors 418, which generate one or more measurement signals in response to motion of HMD 405. Examples of the head tracking sensors 418 include accelerometers, gyroscopes, magnetometers, other sensors suitable for detecting motion, correcting error associated with the IMU 416, or some combination thereof. The head tracking sensors 418 may be located external to the IMU 416, internal to the IMU 416, or some combination thereof.

Based on the measurement signals from the head tracking sensors 418, the IMU 416 generates fast calibration data indicating an estimated position of the HMD 405 relative to an initial position of the HMD 405. For example, the head tracking sensors 418 include multiple accelerometers to measure translational motion (forward/back, up/down, left/right) and multiple gyroscopes to measure rotational motion (e.g., pitch, yaw, and roll). The IMU 416 can, for example, rapidly sample the measurement signals and calculate the estimated position of the HMD 405 from the sampled data. For example, the IMU 416 integrates measurement signals received from the accelerometers over time to estimate a velocity vector and integrates the velocity vector over time to determine an estimated position of a reference point on the HMD 405. The reference point is a point that may be used to describe the position of the HMD 405. While the reference point may generally be defined as a point in space, in various embodiments, a reference point is defined as a point within the HMD 405 (e.g., a center of the IMU 630). Alternatively, the IMU 416 provides the sampled measurement signals to the console 450, which determines the fast calibration data.

The IMU 416 can additionally receive one or more calibration parameters from the console 450. As further discussed below, the one or more calibration parameters are used to maintain tracking of the HMD 405. Based on a received calibration parameter, the IMU 416 may adjust one or more of the IMU parameters (e.g., sample rate). In some embodiments, certain calibration parameters cause the IMU 416 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 420 receives content for the virtual scene from a VR engine 456 and provides the content for display on the electronic display 255. Additionally, the scene rendering module 420 can adjust the content based on information from the vergence processing module 412, the IMU 416, and the head tracking sensors 418. The scene rendering module 420 determines a portion of the content to be displayed on the electronic display 255 based on one or more of the tracking module 454, the head tracking sensors 418, or the IMU 416, as described further below.

The imaging device 460 generates slow calibration data in accordance with calibration parameters received from the console 450. Slow calibration data includes one or more images showing observed positions of the locators 414 that are detectable by imaging device 460. The imaging device 460 may include one or more cameras, one or more video cameras, other devices capable of capturing images including one or more locators 414, or some combination thereof. Additionally, the imaging device 460 may include one or more filters (e.g., for increasing signal to noise ratio). The imaging device 460 is configured to detect light emitted or reflected from the locators 414 in a field of view of the imaging device 460. In embodiments where the locators 414 include passive elements (e.g., a retroreflector), the imaging device 460 may include a light source that illuminates some or all of the locators 414, which retro-reflect the light towards the light source in the imaging device 460. Slow calibration data is communicated from the imaging device 460 to the console 450, and the imaging device 460 receives one or more calibration parameters from the console 450 to adjust one or more imaging parameters (e.g., focal length, focus, frame rate, ISO, sensor temperature, shutter speed, aperture, etc.).

The input interface 470 is a device that allows a user to send action requests to the console 450. An action request is a request to perform a particular action. For example, an action request may be to start or end an application or to perform a particular action within the application. The input interface 470 may include one or more input devices. Example input devices include a keyboard, a mouse, a game controller, or any other suitable device for receiving action requests and communicating the received action requests to the console 450. An action request received by the input interface 470 is communicated to the console 450, which performs an action corresponding to the action request. In some embodiments, the input interface 470 may provide haptic feedback to the user in accordance with instructions received from the console 450. For example, haptic feedback is provided by the input interface 470 when an action request is received, or the console 450 communicates instructions to the input interface 470 causing the input interface 470 to generate haptic feedback when the console 450 performs an action.

The console 450 provides content to the HMD 405 for presentation to the user in accordance with information received from the imaging device 460, the HMD 405, or the input interface 470. In the example shown in FIG. 4, the console 450 includes an application store 452, a tracking module 454, and a VR engine 456. Some embodiments of the console 450 have different or additional modules than those described in conjunction with FIG. 4. Similarly, the functions further described below may be distributed among components of the console 450 in a different manner than is described here.

The application store 452 stores one or more applications for execution by the console 450. An application is a group of instructions, that when executed by a processor, generates content for presentation to the user. Content generated by an application may be in response to inputs received from the user via movement of the HMD 405 or the interface device 470. Examples of applications include gaming applications, conferencing applications, video playback application, or other suitable applications.

The tracking module 454 calibrates the varifocal system 400 using one or more calibration parameters and may adjust one or more calibration parameters to reduce error in determining position of the HMD 405. For example, the tracking module 454 adjusts the focus of the imaging device 460 to obtain a more accurate position for observed locators 414 on the HMD 405. Moreover, calibration performed by the tracking module 454 also accounts for information received from the IMU 416. Additionally, if tracking of the HMD 405 is lost (e.g., imaging device 460 loses line of sight of at least a threshold number of locators 414), the tracking module 454 re-calibrates some or all of the varifocal system 400 components.

Additionally, the tracking module 454 tracks the movement of the HMD 405 using slow calibration information from the imaging device 460 and determines positions of a reference point on the HMD 405 using observed locators from the slow calibration information and a model of the HMD 405. The tracking module 454 also determines positions of the reference point on the HMD 405 using position information from the fast calibration information from the IMU 416 on the HMD 405. Additionally, the tracking module 454 may use portions of the fast calibration information, the slow calibration information, or some combination thereof, to predict a future location of the HMD 405, which is provided to the VR engine 456.

In some embodiments, the VR engine 456 maintains focal capability information of the varifocal block 260. Focal capability information is information that describes what focal distances are available to the varifocal block 260. Focal capability information may include, e.g., a range of focus the varifocal block 260 is able to accommodate (e.g., 0 to 4 diopters), a resolution of focus (e.g., 0.25 diopters), a number of available focal distances, combinations of settings for LC lenses (e.g., active or non-active) that map to particular focal distances, or some combination thereof.

The VR engine 456 generates varifocal instructions for the varifocal block 260, the varifocal instructions causing the varifocal block 260 to adjust its focal distance to a particular location. The VR engine 456 generates the varifocal instructions based on focal capability information and, e.g. information from the vergence processing module 412, the IMU 416, and the head tracking sensors 418. The VR engine 456 uses the information from the vergence processing module 412, the IMU 416, and the head tracking sensors 418, or some combination thereof, to select an ideal focal distance to present content to the user. The VR engine 456 then uses the focal capability information to select a focal distance that is closest to the ideal focal distance. The VR engine 456 uses the focal information to determine settings for one or more LC lenses within the varifocal block 260 that are associated with the selected focal distance. The VR engine 456 generates varifocal instructions based on the determined settings, and provides the varifocal instructions to the varifocal block 260.

The VR engine 456 executes applications within the varifocal system 400 and receives position information, acceleration information, velocity information, predicted future positions, or some combination thereof for the HMD 405 from the tracking module 454. Based on the received information, the VR engine 456 determines content to provide to the HMD 405 for presentation to the user, such as a virtual scene, one or more virtual objects to overlay onto a real world scene, etc. Additionally, the VR engine 456 performs an action within an application executing on the console 450 in response to an action request received from the input interface 470 and provides feedback to the user that the action was performed. The provided feedback may be visual or audible feedback via the HMD 405 or haptic feedback via VR input interface 470.

In alternative embodiments, some or all of the functionality of the VR engine 456 is performed by the HMD 405. For example, the HMD 405 may maintain the focal capability information and generate varifocal instructions based on the focal capability information and, e.g. information from the vergence processing module 412, the IMU 416, and the head tracking sensors 418.

Figure 5:
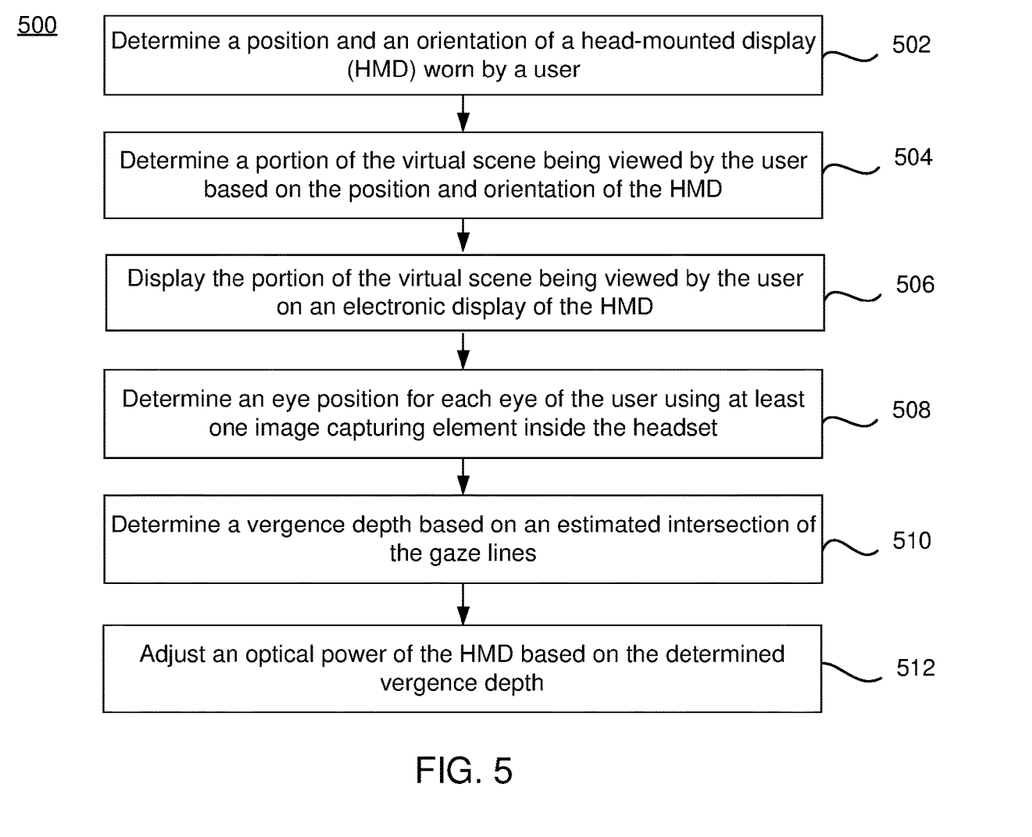
FIG. 5 is a process for mitigating vergence-accommodation conflict by adjusting the focal length of an HMD, according to an embodiment.

FIG. 5 is a process 500 for mitigating vergence-accommodation conflict by adjusting the focal length of an HMD 200, according to an embodiment. The process 500 may be performed by the varifocal system 400 in some embodiments. Alternatively, other components may perform some or all of the steps of the process 800. For example, in some embodiments, a HMD 200 and/or a console (e.g., console 450) may perform some of the steps of the process 500. Additionally, the process 500 may include different or additional steps than those described in conjunction with FIG. 5 in some embodiments or perform steps in different orders than the order described in conjunction with FIG. 5.

As discussed above, a varifocal system 400 may dynamically vary its focus to bring images presented to a user wearing the HMD 200 into focus, which keeps the user's eyes in a zone of comfort as vergence and accommodation change. Additionally, eye tracking in combination with the variable focus of the varifocal system allows blurring to be introduced as depth cues in images presented by the HMD 200.

Accordingly, in the embodiment shown by FIG. 5, a position, an orientation, and/or a movement of HMD 405 are determined 502 by a combination of the locators 414, the IMU 416, the head tracking sensors 418, the imagining device 460, and the tracking module 454, as described above in conjunction with FIG. 4. Portions of a virtual scene presented by the HMD 405 are mapped to various positions and orientations of the HMD 405. Thus, a portion of the virtual scene currently viewed by a user is determined 504 based on the position, orientation, and movement of the HMD 405.

The virtual scene corresponding to the portion of the virtual scene being viewed by the user is displayed 506 on the electronic display 255. In some embodiments, the portion is display with a distortion correction to correct for optical error that may be caused by the image light passing through the LC lens within the varifocal block 260. Further, the varifocal block 260 has activated/deactivates one or more of its LC lenses to provide focus and accommodation to the location in the portion of the virtual scene where the user's eyes are verged.

Figure 6:
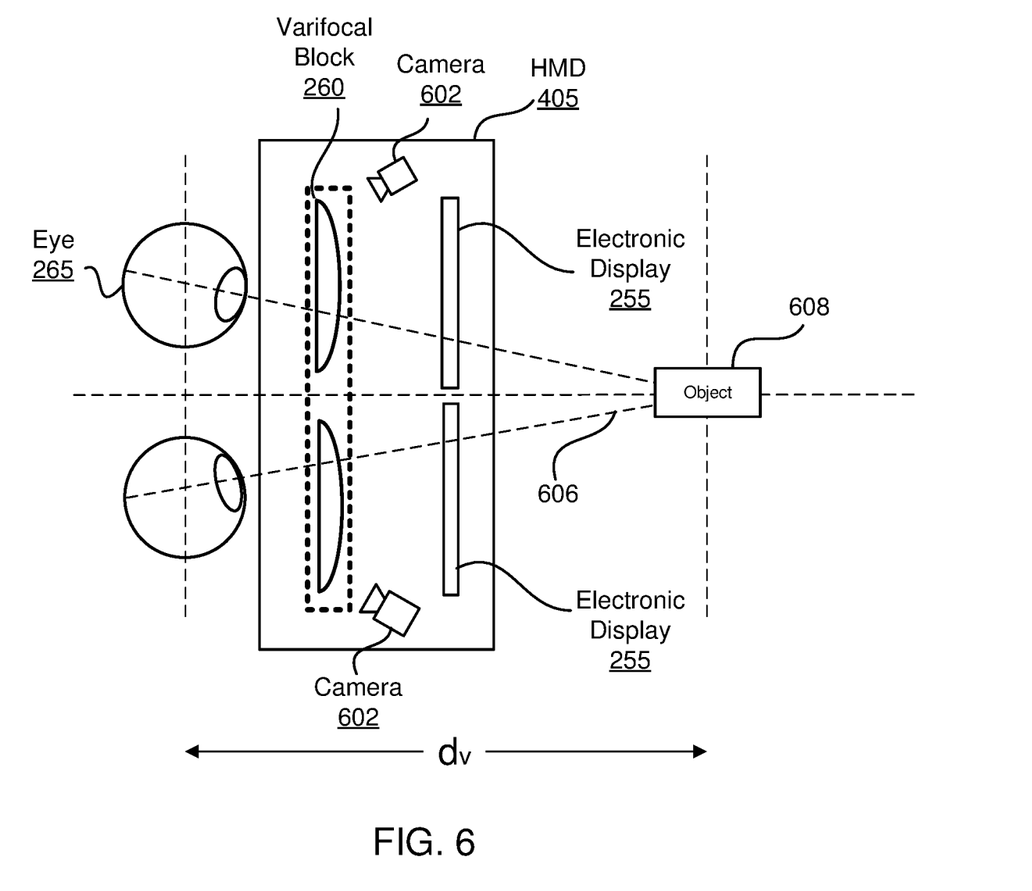
FIG. 6 shows an example process for mitigating vergence-accommodation conflict by adjusting a focal length of a varifocal block that includes two stacked LC structures, in accordance with an embodiment.

After determining 504 and displaying 506 the portion of the virtual scene being viewed by the user, the varifocal system 400 may then determine a location or an object within the determined portion at which the user is looking to adjust focus for that location or object accordingly. To determine the location or object within the determined portion of the virtual scene at which the user is looking, the HMD 405 tracks the position and location of the user's eyes using image information from a camera or other image capturing element, for example. Thus, the HMD 405 determines 508 an eye position for each eye of the user. For example, the HMD 405 tracks at least a subset of a 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, FIG. 6 shows a cross section of an embodiment of the HMD 405 that includes camera 602 for tracking the position of each eye 265, the electronic display 255, and the varifocal block 604 that includes stacked LC structures, as described with respect to FIG. 2B. In this example, the camera 602 captures images of the user's eyes looking at an object 608 and the eye tracking module 410 determines an output for each eye 265 and gaze lines 606 corresponding to the gaze point or location where the user is looking based on the captured images. Accordingly, vergence depth ($d_v$) of the object 608 (also the user's gaze point) is determined 510 based on an estimated intersection of the gaze lines 606. As shown in FIG. 6, the gaze lines 606 converge or intersect at distance dam, where the object 608 is located.

Accordingly, referring again to FIG. 5, one or more of the LC lenses within the stacked LC structures are activated and/or deactivated to adjust 512 an optical power of the varifocal block 260. As described above, the optical power of the varifocal block 260 is adjusted to change a focal distance of the HMD 405 to provide accommodation for the determined vergence depth corresponding to where or what in the displayed portion of the virtual scene the user is looking.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD), comprising:
an electronic display configured to emit image light;
an eye tracking module configured to determine a position of an eye of a user of the HMD; and
a varifocal block comprising a stacked liquid crystal (LC) structure between the electronic display and an exit pupil of the HMD,
wherein the stacked LC structure has a tunable optical power and comprises a plurality of single LC lenses that are in series such that the image light emitted by the electronic display passes through each of the plurality of single LC lenses in series, the plurality of single LC lenses includes a LC lens having a discrete optical power selected between an active optical power value and an inactive power value, and the varifocal block is configured to present the image light to the user of the HIVID at an adjustable focal distance that is determined by the tunable optical power and is based in part on the determined position of the eye,
wherein the plurality of single LC lenses includes a first LC lens having a first polarization structure, a second LC lens having a second polarization structure that is reverse to the first polarization structure, and a third LC lens having a third polarization structure that corresponds to the first polarization structure, and the second LC lens is located between the first LC lens and the third LC lens,
wherein the tunable optical power of the stacked LC structure is based in part on respective optical power values of the plurality of single LC lenses.

2. The HMD of claim 1, wherein the each of the plurality of single LC lenses has a polarization structure, and the polarization structure for adjacent LC lenses are reversed.

3. The HMD of claim 1, wherein the LC structure has a switching time of at most 300 ms and the tunable optical power is over a range of at least 2 diopters.

4. The HMD of claim 1, wherein the plurality of single LC lenses includes a fourth LC lens having a fourth polarization structure that corresponds to the second polarization structure, and the third LC lens is located between the second LC lens and the fourth LC lens.

5. The HMD of claim 1, wherein at least one of the plurality of single LC lenses includes a liquid crystal medium selected from a group consisting of: W1791, W1865, and W1825.

6. The HMD of claim 1, wherein each of the plurality of single LC lenses has a discrete optical power value selected from a group consisting of: an active optical power value and an inactive optical power value.

7. The HMD of claim 6, wherein the plurality of single LC lenses includes a first LC lens and a second LC lens, and at least one of the active optical power value and the inactive optical power value for the first LC lens is different from the active optical power value and the inactive optical power value for the second LC lens.

8. The HMD of claim 6, wherein the plurality of single LC lenses includes a first LC lens, and the inactive optical power value for the first LC lens is zero diopters.

9. The HMD of claim 6, wherein the plurality of single LC lenses includes a first LC lens, and the active optical power value for the first LC lens is negative.

10. A head-mounted display (HMD), comprising:
an electronic display configured to emit image light
an eye tracking module configured to determine a position of an eye of a user of the HMD; and
a varifocal block comprising a stacked liquid crystal (LC) structure between the electronic display and an exit pupil of the HIVID, wherein the stacked LC structure has a tunable optical power and comprises a plurality of single LC lenses that are in series such that the image light emitted by the electronic display passes through each of the plurality of single LC lenses in series, the plurality of single LC lenses includes a LC lens having a discrete optical power selected between an active optical power value and an inactive power value, and the varifocal block is configured to present the image light to the user of the HIVID at an adjustable focal distance that is determined by the tunable optical power and is based in part on the determined position of the eye, wherein the tunable optical power of the stacked LC structure is based in part on respective optical power values of the plurality of single LC lenses,
wherein at least one LC lens of the plurality of single LC lenses includes (i) two substrates, at least one substrate of which has an inhomogeneous thickness defining a Fresnel structure including a plurality of Fresnel zones, and (ii) a liquid crystal medium having a refractive index matching a refractive index of the one substrate when the LC lens is not activated so that the LC lens operates as a Fresnel lens when activated and has no optical power when not activated.

11. A varifocal system comprising:
a head-mounted display (HMD) comprising:
an electronic display configured to emit image light,
an eye tracking module configured to determine positions of eyes of a user of the HIVID,
a processor configured to determine a gaze location using the determined positions of the eyes of the user,
a varifocal block comprising a stacked liquid crystal (LC) structure between the electronic display and an exit pupil of the HIVID,
wherein the stacked LC structure has a tunable optical power and comprises a plurality of single LC lenses that are in series such that the image light emitted by the electronic display passes through each of the plurality of single LC lenses in series, the plurality of single LC lenses includes a LC lens having a discrete optical power selected between an active optical power value and an inactivate power value, and the varifocal block is configured to present the image light to the user of the HIVID at an adjustable focal distance that is determined by the tunable optical power, and the varifocal block is configured to tune the tunable optical power in accordance with varifocal instructions, wherein the plurality of single LC lenses includes a first LC lens having a first polarization structure, a second LC lens having a second polarization structure that is reverse to the first polarization structure, and a third LC lens having a third polarization structure that corresponds to the first polarization structure, and the second LC lens is located between the first LC lens and the third LC lens, wherein the tunable optical power of the stacked LC structure is based in part on respective optical power values of the plurality of single LC lenses; and a console including a second processor, the console configured to:
  generate, using the second processor, the varifocal instructions using the gaze location, and
  provide, using the second processor, the varifocal instructions to the HMD.

12. The varifocal system of claim 11, wherein the each of the plurality of single LC lenses has a polarization structure, and the polarization structure for adjacent LC lenses are reversed.

13. The varifocal system of claim 11, wherein the LC structure has a switching time of at most 300 ms and the tunable optical power is over a range of at least 2 diopters.

14. The varifocal system of claim 11, wherein the plurality of single LC lenses includes a fourth LC lens having a fourth polarization structure that corresponds to the second polarization structure, and the third LC lens is located between the second LC lens and the fourth LC lens.

15. The varifocal system of claim 11, wherein at least one of the plurality of single LC lenses forms a Fresnel structure including a plurality of Fresnel zones.

16. The varifocal system of claim 15, wherein the electronic display includes a plurality of sub-pixels that emit image light, and the sub-pixels are selected from a group consisting of: quantum light emitting diodes, and quantum organic light emitting diodes.

17. The varifocal system of claim 11, wherein each of the plurality of single LC lenses has an optical power value selected from a group consisting of: an active optical power value and an inactive optical power value.

18. The varifocal system of claim 17, wherein the plurality of single LC lenses includes a first LC lens and a second LC lens, and at least one of the active optical power value and the inactive optical power value for the first LC lens is different from the active optical power value and the inactive optical power value for the second LC lens.

19. The varifocal system of claim 17, wherein the plurality of single LC lenses includes a first LC lens, and the inactive optical power value for the first LC lens is zero.

20. The varifocal system of claim 17, wherein the plurality of single LC lenses includes a first LC lens, and the active optical power value for the first LC lens is negative.

* * * * *

UNITED STATES PATENT AND TRADEMARK OFFICE
CERTIFICATE OF CORRECTION

PATENT NO. : 10,901,205 B1
APPLICATION NO. : 15/672458
DATED : January 26, 2021
INVENTOR(S) : Lu et al.

It is certified that error appears in the above-identified patent and that said Letters Patent is hereby corrected as shown below:

In the Claims

Claim 1, Column 13, Line 45, delete "HIVID" and insert --HMD--;

Claim 10, Column 14, Line 30, delete "HIVID" and insert --HMD--;

Claim 10, Column 14, Line 39, delete "HIVID" and insert --HMD--;

Claim 11, Column 14, Line 58, delete "HIVID" and insert --HMD--;

Claim 11, Column 14, Line 63, delete "HIVID" and insert --HMD--;

Claim 11, Column 15, Line 6, delete "HIVID" and insert --HMD--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*